United States Patent [19]

Burkel

[11] 4,341,446
[45] Jul. 27, 1982

[54] MICROFICHE READING CARREL

[75] Inventor: Russell J. Burkel, Hartland, Wis.

[73] Assignee: Realist, Inc., Menomonee Falls, Wis.

[21] Appl. No.: 201,059

[22] Filed: Oct. 27, 1980

[51] Int. Cl.³ .............................................. G03B 21/24
[52] U.S. Cl. ...................................... 353/77; 350/123; 352/104; 353/79; 353/97; 353/119
[58] Field of Search ................... 353/74, 78, 79, 98, 353/119, 75, 77, 99, 97, 18, 47, 67; 350/123; 352/104

[56] References Cited

U.S. PATENT DOCUMENTS

| 1,624,816 | 4/1927 | Triana et al. | 353/78 |
| 2,015,665 | 10/1935 | Eitzen | 353/78 |
| 2,174,778 | 10/1939 | Croft | 353/78 |
| 2,562,297 | 7/1951 | Cordonner | 353/79 |
| 3,246,943 | 4/1966 | Holt | 353/98 |
| 3,893,759 | 7/1975 | Crew | 353/79 |

Primary Examiner—Steven L. Stephan
Attorney, Agent, or Firm—Bayard H. Michael

[57] ABSTRACT

The microfiche projector enlarges the image onto the flat white undersurface of the top panel of the enclosure which has a flat black interior. The viewer sees the image reflected in the adjustable 45° mirror. The apparent image is about 50" in front of the user to reduce eye fatigue. The image is non-directional which allows considerable movement of the user.

3 Claims, 3 Drawing Figures

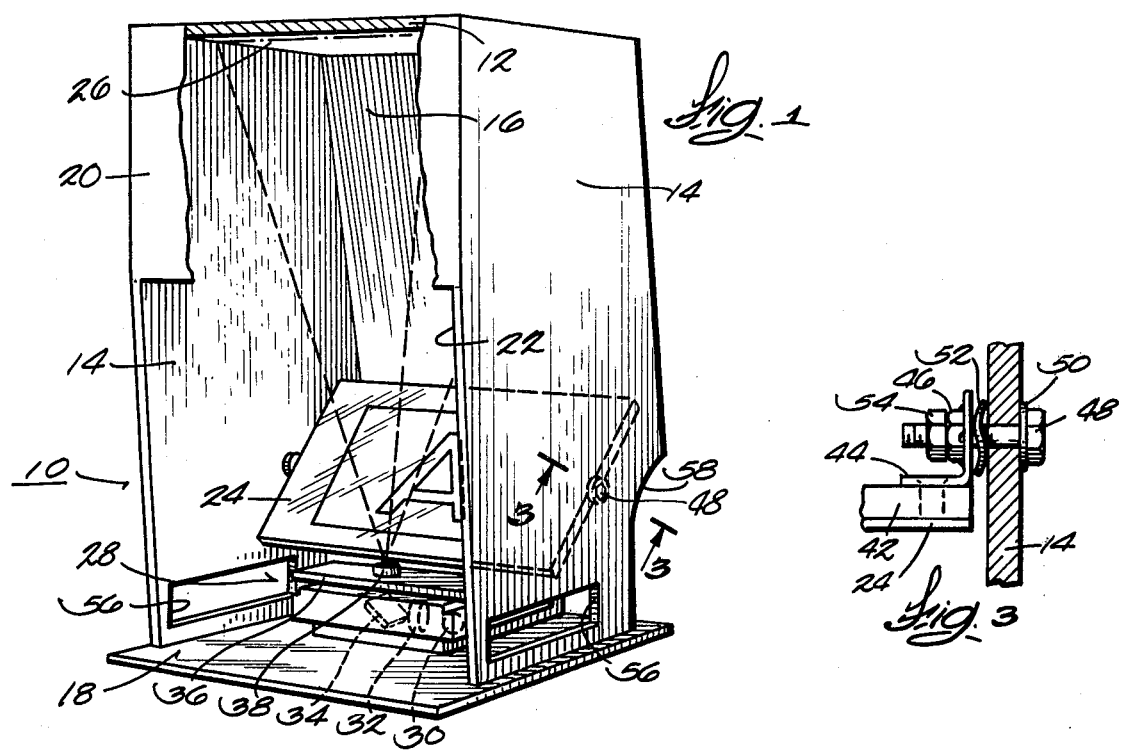
Fig. 1
Fig. 3
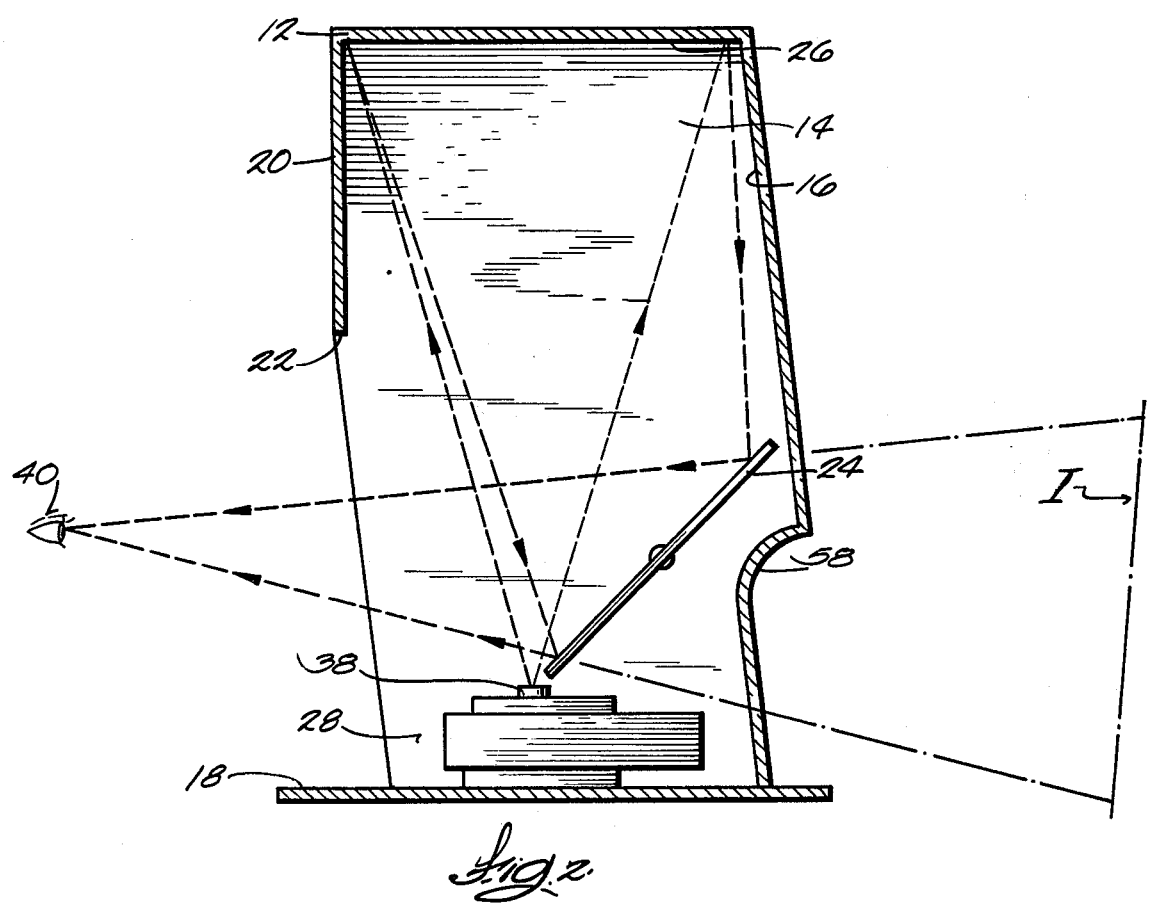
Fig. 2

MICROFICHE READING CARREL

FIELD OF THE INVENTION

A microfiche reader for use in high ambient light conditions with reduced eye strain and improved physical comfort.

BACKGROUND PRIOR ART

Microfiche readers commonly employ a folded projection [the light path is reflected by mirror(s)] onto a front or rear projection screen which is treated to intensify the image so long as the viewer is quite close to the projection axis. These readers are satisfactory for use over a short period of time but are subject to numerous problems if used for a long period. If used in high ambient light the image is washed out and lacks contrast causing eye strain. In low ambient light the contrast is too high and causes eye strain. The intensifying screen causes the image to be grainy with loss of definition and scintillation of the image . . . again causing eye strain. Since the proper viewing position is highly confined . . . when viewed too far off the projection axis there is a severe loss of brightness . . . the user is constrained to a fixed position and experiences physical discomfort. And a little appreciated factor is that the image is viewed at close range . . . say 18" . . . and requires continuous toe-in of the eyes (as does normal reading) which is fatiguing. In normal reading the reader relieves the toe-in tension by looking up but with a microfiche reader the sheer size makes it less likely the eyes will focus on something else to relieve the toe-in. Since microfiche readers deal with high magnifications at short projection distances the image brightness falls off from the center to edge and this is accentuated by the image brightening screen. This also leads to eye fatigue.

U.S. Pat. Nos. 2,562,297 and 3,893,759 show microfiche readers which project the image onto an overhead screen and the viewer looks into a small mirror close to the projection path to see the reflected image of the projected image. The reflected image will appear to be straight ahead. This image, called the virtual image, is about normal size and distance for microfiche readers. Both patents employ intensifying screens and require a confined viewing position. While small skirts hang down at the sides of the screen, the screen will be adversely affected by ambient light.

The problem of image degradation by ambient light was addressed in connection with slide and moving pictures projection in U.S. Pat. Nos. 1,624,816 and 2,015,665. The former shows a vertical box having a projector projecting an image by a folded light path onto a screen on the top inside surface. The image is viewed through an aperture in the lower front of the box by means of a mirror fixed in the box. The other patent shows a similar arrangement but projects horizontally instead of vertically. Both systems require a fairly confined viewing position due to the fixed angles of the mirrors. Both are subject to contrast degradation due to inadequate precautions against ambient light being reflected onto the screen.

SUMMARY OF THE INVENTION

The object of this invention is to provide a microfiche reading carrel which will optimize eye and physical comfort of the viewer-user to enable use of the reader for long periods. The use of microfiche readers in conjunction with long research programs has been resisted due to the eye strain and physical discomfort long associated with microfiche readers. This invention utilizes a vertically disposed light box having a generous opening in the lower front to enable the microfiche to be manipulated and to permit the viewer to see a front surface mirror which will reflect the image projected on the inside top of the box. The virtual image will appear to be about 50 inches from the viewer. The actual image is enlarged 1.5× to 2× the size the fiche would normally be enlarged. A 24× fiche is projected to 48×. Thus, the image will appear to be 50 inches away but the size of the image will appear almost full size. Therefore, the image is highly readable but the eyes are not required to toe-in to the extent which would normally be required for that size image. The eye strain (and loss of ability to focus) associated with toe-in over a long period does not occur. The projection screen is a flat white surface which maximizes definition and contrast and minimizes variation in brightness. The inside walls of the box are painted flat black and the bottom is also flat black. Additionally, the bottom also extends forward from the box. The black walls reduce bounce-back of ambient light and minimizes glare on the screen. The extended flat bottom is quite important to prevent or minimize ambient light being reflected into the box.

Since the image on the flat white screen is markedly non-directional, the viewer can move from side to side without appreciable loss of quality. The mirror is tiltable about an axis and is frictionally held in position. Should the user wish to slouch, he can do so and adjust for the change in viewing position simply by tilting the mirror. Users of different heights are easily accommodated. The use of a flat white screen eliminates scintillation or grain of the image.

The result of this combination is an image which is as easy to read as a paper copy . . . easier, in fact, because the eyes only have to toe-in to about 50 inches.

BRIEF DESCRIPTION OF THE DRAWINGS

FIG. 1 is a perspective view with parts broken away and dotted in to illustrate the invention.

FIG. 2 is a vertical section from the side of FIG. 1.

FIG. 3 is an enlarged detail of the mounting for the mirror.

DETAILED DESCRIPTION OF DRAWINGS

The carrel 10 is essentially a vertically disposed rectangular box having a top 12, sides 14, back 16, bottom 18 and a front panel 20 which depends from the top approximately one-third the way down the height of the carrel leaving a large opening 22 through which the user may view the front surface mirror 24 to see the image projected on a flat white undersurface 26 of the top 12. The image is projected on the projection screen 26 by the microfiche projector generally designated 28. This projector has projection system including a bulb 30, condensor lens 32, a 45° mirror 34 reflecting the light upwardly through a fiche supported in carrier 36 and through the projection lens 38 to project an enlarged image onto the projection surface 26. It will be noted in FIG. 2 that the lower edge of the front surface mirror 24 is clear of the cone of light projected from lens 38.

When the viewer's eye is located as indicated at 40, he sees the front surface mirror which reflects the image which is projected onto the flat white undersurface 26 of the top panel. The virtual image I will appear as if located beyond the carrel as indicated in FIG. 2. This will, in normal usage, appear to be about 50 inches from the viewer. If a normal microfiche were enlarged only to its original size, the image would appear too small. Therefore, the projection system is designed to enlarge the image to 1½ to 2 times the amount of reduction in the microfiche itself. Thus, if the image constituted 24× reduction, the projected image should be an enlargement of 36×–48×. This degree of enlargement of the virtual image at 50 inches will appear comfortably large and yet not require the user's eyes to toe-in to the extent normal with the usual reading distance of, say 18 inches. This greatly increases the comfort and reduces eye fatigue over a long period of time.

The front surface mirror 24 is mounted on a support panel 42 which at the mid-point of each of its sides is provided with an angle bracket 44 fixed to the rear edge and having a leg projecting rearwardly of the panel. Nut 46 is welded to the inside of the leg and the assembly is pivotally supported in the side walls 14 by means of a bolt 48 passing through the side 14 with a washer 50 between the head of the bolt 48 and the side 14. The threaded portion of the bolt 48 threads into the nut 46 welded to the bracket and captures a wavy washer 52 between the bracket leg and the side wall 14. Locknut 54 is then run down the projecting end of bolt 48 and tightened against the welded nut 46 to retain the adjusted setting with the wavy washer imparting a frictional load to the pivot point. The frictional load imparted is adjustable by tightening the bolt. With this arrangement, the mirror can be easily tilted to any desired angle and yet will remain in the adjusted position. This means that the height of the user's eyes relative to the mirror is not in any way constrained or confined by the mirror. A tall person or a short person simply tilts the mirror so as to see the projected image. The image will appear with parallel sides in all cases, and is completely comfortable to read. Similarly, the viewer can hunch forward, can lean back, and can move from side to side since there is no directionality to the image projected onto the flat white projection screen 26 which has no brightness enhancing features such as a beaded surface or lenticular surface. The image brightness from the center to the edges appears more uniform and is not dependent upon the viewer being on the projection axis. This makes the viewing very comfortable since the user can assume many different positions. Normally, reading a microfiche card with the constraints imposed by the usual microfiche viewing system results in the user getting quite tired. Thus, microfiche readers have traditionally been used for limited time viewing. The present arrangement is suitable for extended viewing sessions, such as might be encountered in legal research or other library/research projects.

It has been found quite important that the insides of the front, back, sides and the top surface of the bottom be painted or otherwise given a flat black non-reflecting finish to minimize bouncing the ambient light into the carrel with degradation of the image. Indeed it has been found quite important to extend the bottom 18 forwardly of the side walls to minimize reflecting the ambient light into the carrel. This forward extension can also serve as a support for a note pad or the like, and in this regard it should be noted that a white note pad placed on the top surface of the bottom panel will reflect enough ambient light into the carrel to cause degradation of the image. Therefore, the note pad would be placed in that position only when in actual use.

It will be appreciated that the details of the projection system for the fiche are not important to the present invention. The design shown schematically in FIG. 1 is desirable in that it reduces the vertical height of the projection system. It should be noted that side panels have openings 56 allowing endwise movement of the microfiche holder through the sides of the carrel. The amount of light spilling in through these openings is not of consequence since it first strikes the black sides of the projector and does not reflect up to the image. If desired, ventilation holes can also be provided in the rear of the carrel so as to insure an adequate cool air supply to the projector. The side panels may be provided with the cut out portions 58 at the lower rear corners (with the back correspondingly formed to seal against light leakage) to, in effect, provide a tunnel across the lower back of the carrel for ventilation purposes in the event the carrel is pushed up against a wall.

It is important that the mirror be pivoted on its horizontal axis so that the image will not keystone with the mirror is adjusted (keystoning being non-parallel sides in the image which is a most disturbing effect). It is important that the mirror be adjustable. The mirror should be front surfaced for maximum clarity of the image. The projection surface should be a smooth, flat white finish to achieve maximum sharpness of the image. The image should be enlarged 1½× to 2× the normal enlargement. When all of these things are done, the user can use the microfiche carrel for protracted periods with far greater comfort than heretofore possible. The carrel, with its flat black interior and top surface of the bottom, can be used in high ambient light conditions. Thus, it can be placed in a library having ambient light satisfactory for normal reading and the image will still appear sharp and well-defined.

It will be understood the term microfiche embraces other film microforms of projection for information retreival.

I claim:

1. A microfiche reading carrel comprising:
   a generally rectangular enclosure having long dimension vertically disposed and including a top, bottom, sides, back and a front which depends from the top only part ways towards the bottom to leave a substantial front opening in the lower portion of the front, said bottom extending forwardly of the sides and top,
   the upper surface of said bottom and the inside surfaces of said front, back and sides being non-reflecting black,
   a microfiche projector mounted on said bottom to project an image onto the underside of said top,
   said underside of the top having a flat white surface serving as a projection screen which does not enhance or brighten the projected image,
   a front surface mirror mounted inside the enclosure to the rear of the light path of the projected image, said mirror being mounted for adjustment about a horizontal axis generally on the horizontal axis of the mirror,
   the image on the screen being reflected by the mirror to the person using the carrel through the front opening.

2. A carrel according to claim 1 in which the projector enlarges the image onto the screen to a size which is 1.5 to 2 times the reduction of the fiche so the image is 1.5 to 2 times the size of the original document.

3. A carrel according to claim 1 or 2 in which the adjustable mounting for the mirror imposes a friction load on the mounting to frictionally retain the mirror in its adjusted position while allowing the mirror to be tilted with little effort.

* * * * *